Aug. 19, 1941.  T. B. PEPPER  2,252,727
TELEMETRIC LEVEL
Filed Aug. 24, 1938  2 Sheets-Sheet 1
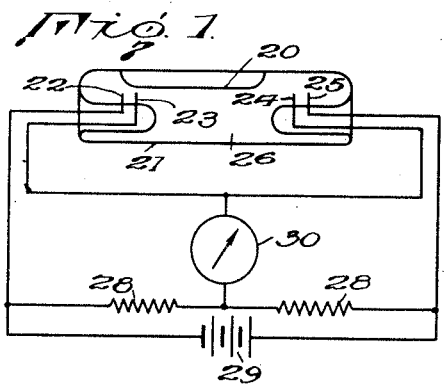
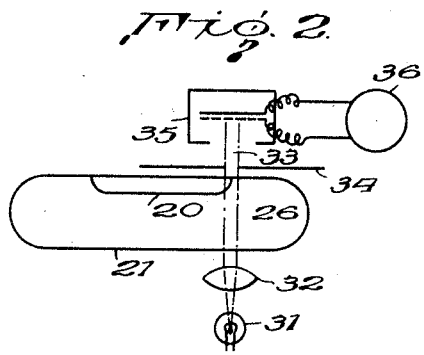
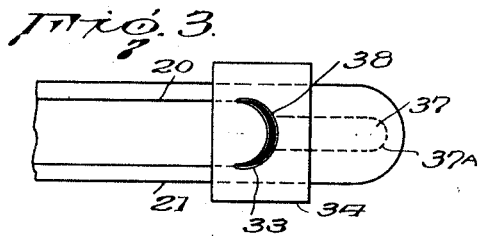
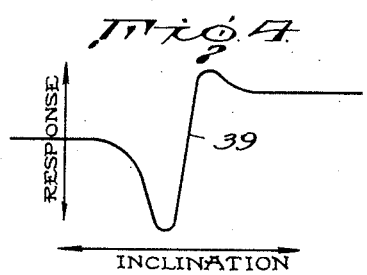
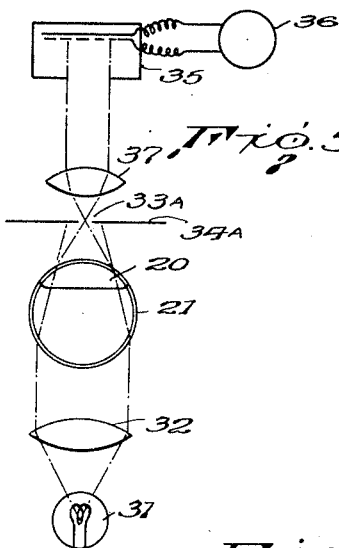
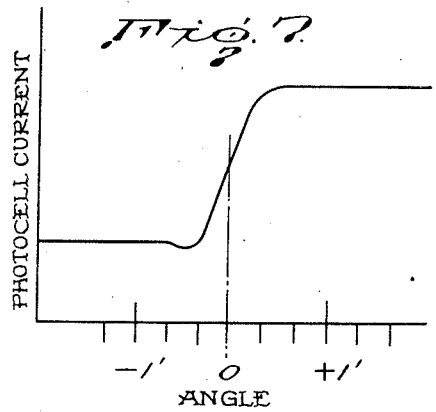
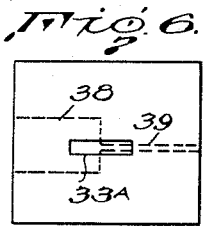
Inventor
Theodore B. Pepper,
By A. M. Houghton
his Attorney Aug. 19, 1941.   T. B. PEPPER   2,252,727
TELEMETRIC LEVEL
Filed Aug. 24, 1938   2 Sheets-Sheet 2
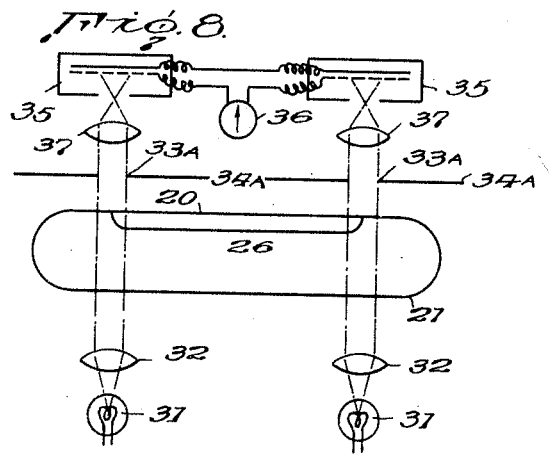
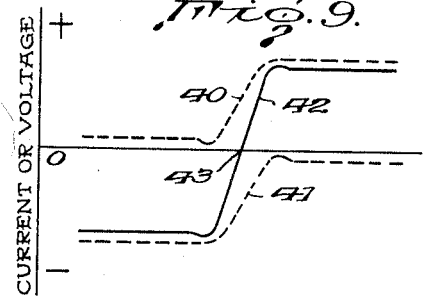
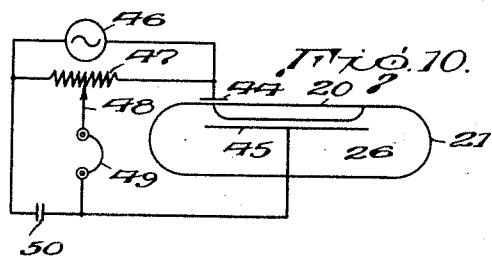
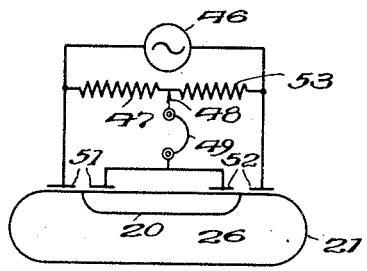
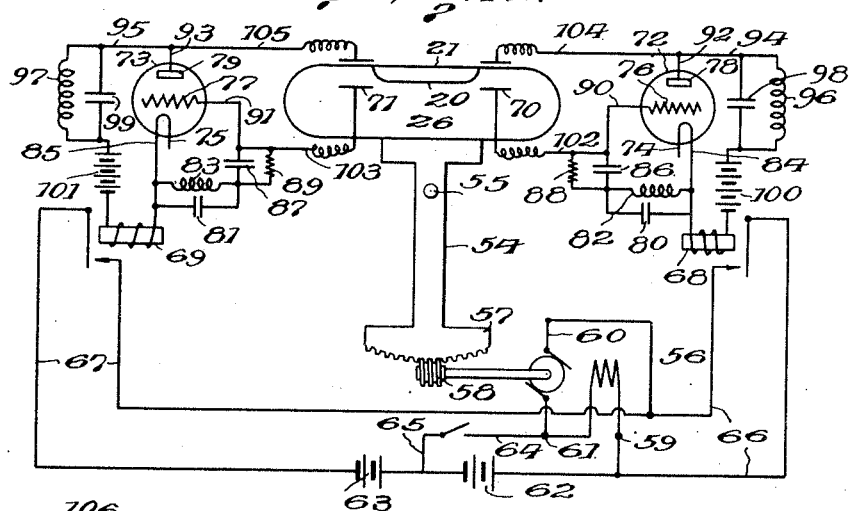
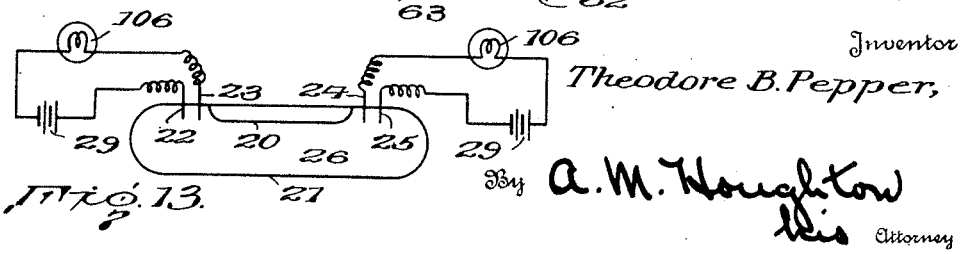
Inventor
Theodore B. Pepper,
By A. M. Houghton
his Attorney Patented Aug. 19, 1941

2,252,727

UNITED STATES PATENT OFFICE 2,252,727

TELEMETRIC LEVEL

Theodore B. Pepper, Oakmont, Pa., assignor to Gulf Research & Development Company, Pittsburgh, Pa., a corporation of Delaware Application August 24, 1938, Serial No. 226,603

15 Claims. (Cl. 177—351)

This invention or discovery relates to telemetric levels, and it comprises, in combination, a level-responsive device or "bubble level" adapted to be attached to a device the level of which is to be measured, or which it is desired to maintain in predetermined position with respect to the horizontal, and telemetric indicating means actuated by said level-responsive device and adapted to give an indication of the position of the level-responsive device with respect to the horizontal; and also, in a more specific form, including governing means actuated by any variation of the level-responsive device and the device to which it is attached from a predetermined position with respect to the horizontal, and adapted to correct such variation by returning the level-responsive device and the device to which it is attached to said predetermined position; all as more fully hereinafter set forth and as claimed.

The ordinary bubble level, consisting of a curved glass flask containing a body of liquid adapted to provide a meniscus defining a bubble, is a convenient and simple level-responsive device, and if carefully designed and constructed, is highly accurate and sensitive. The instrument is observed by noting the position of the bubble; a suitable scale or other indicia sometimes being provided to facilitate the observations.

In many instances, however, it may be desired to use a level in installations where the level is inaccessible to the eye or accessible to the eye only with difficulty. For example, gravimeters used in geophysical work are sometimes located under water. These gravimeters must be very accurately leveled and should be maintained in a level position. The ordinary level-responsive devices cannot be used in connection with such devices, except perhaps during the initial setting and leveling of the gravimeter, but not thereafter.

In the present invention, I provide a special form of level-responsive device, based on the bubble principle and adapted to be attached to or otherwise associated with an element (e. g. a gravimeter) the level of which is to be tested. I further provide telemetric means adapted to give an indication at a remote point of the position of a level-responsive device and the apparatus with which it is associated. More particularly, the invention includes a bubble level in combination with means responsive to the position of the bubble and adapted to vary an electrical current in accordance with changes in said position, and an indicating device responsive to variations in said current.

Where high sensitivity is required, as in the case of gravimeters and other devices which must be held in a horizontal position with extreme precision, it is necessary to avoid any type of construction which will adventitiously affect the bubble position or hinder the motion of the bubble induced by changes in position, or introduce irregularities into the motion of the bubble. The seriousness of this factor is strikingly shown by the observed fact that marks engraved on the outside of a level vial of high sensitivity frequently cause sufficient distortion of the inner surface of the vial to produce irregularity in the motion of the bubble. One of the achieved objects of my invention with respect to precision levels is the provision of means for indicating the bubble position within the vial, which does not interfere with or react upon the free motion of the bubble.

In one form of my invention, an indication of the position of the bubble is provided by employing a conducting liquid in the vial and locating electrodes in the interior of the level vial in such manner that the position of the bubble will cause variations in an electric current passing between said electrodes, the electrodes being located out of the direct path of the bubble but nevertheless in such position with respect to the bubble that movement of the bubble will cause variations in said electrical current. In a modification, capacitance electrodes are employed to achieve a similar result.

In another embodiment, movement of the bubble is arranged to affect a light beam from a source to a photoelectric cell, an appropriate translating device, that is an indicating or relay circuit, being provided for the cell.

In some cases, means are also provided whereby the electrical output of the level-responsive device is measured by a sensitive relay circuit based on the null principle.

In a further specific embodiment of my invention I provide a device adapted to correct variations from the horizontal or from a predetermined position with respect to the horizontal, which may be suffered by the device to which the level is attached. In one specific form this is achieved by the provision of a relay system, preferably of the vacuum tube type, adapted to actuate a motor in accordance with movement of the bubble within the level vial. In the preferred embodiment this device is characterized by the provision of a neutralized oscillatory vacuum tube circuit of extreme sensitivity, the function of the circuit being controlled by the bubble level and this circuit in turn controlling a motor adapted to return the level-responsive device or the device to which it is attached to a level position, or to said predetermined position with respect to the horizontal, should any temporary deviation from said position occur.

In instances where high precision is not required, my invention also comprises an extremely simple but advantageous telemetric level, wherein variations in the position of the bubble within a level vial are caused to create corresponding signals.

In all embodiments the means which respond to the bubble position are located adjacent the end or ends of the bubble in its level position, and are symmetrical with respect to the vertical plane passing through the long axis of the bubble whereby disturbance of the indication due to any rotation of the vial about its long axis is minimized.

In addition to the objects enumerated hereinabove, my invention has achieved such additional operative advantages and improvements as may hereinafter be found to obtain.

In order that my invention may be clearly set forth and understood, I now describe, with reference to the drawings accompanying and forming part of this specification, various specific forms and manners in which my invention is embodied and utilized, but without limiting my invention to such specific and illustrative examples. In these drawings, Fig. 1 is a more or less diagrammatic view of a telemetric level device in accordance with my invention;

Fig. 2 is a similar view of an alternative form of telemetric level, also in accordance with my invention;

Fig. 3 is a plan view of a portion of the level vial illustrated in Fig. 2, illustrating illumination of the same;

Fig. 4 is a diagram illustrating variation of current intensity produced by movement of the bubble in the form of my invention illustrated in Figs. 2 and 3;

Fig. 5 is a sectional and more or less diagrammatic view of another form of telemetric level in accordance with my invention;

Fig. 6 is a plan view of a portion of the apparatus shown in Fig. 5;

Fig. 7 is a diagram showing fluctuations of photo-cell current produced by movement of the level bubble in the apparatus illustrated in Figs. 5 and 6;

Fig. 8 is an elevational view of a specific embodiment of the device illustrated in Figs. 5 and 6;

Fig. 9 is an electrical diagram illustrating variation in current intensity effected by movement of the level bubble in the form of telemetric level illustrated in Fig. 8;

Fig. 10 is a more or less diagrammatic view of portions of a telemetric level device in accordance with my invention, preferably adapted for use in connection with a level vial containing two fluids sharply differing in electrical conductivity or dielectric strength;

Fig. 11 is a more or less diagrammatic view of another form of my invention, wherein a capacity bridge is employed in order to provide a null reading of the indicating device corresponding to a predetermined position of the level bubble;

Fig. 12 is a more or less diagrammatic view and wiring diagram of a self-leveling device constructed in accordance with my invention; and Fig. 13 is a similar view of a simple form of telemetric level adapted for use in instances where high precision is not required.

Similar reference numerals designate similar parts in the several views of the drawings.

Fig. 1 illustrates one form of apparatus within the purview of my invention for indicating the position of a bubble 20 within a level vial 21. The electrodes or contacts 22, 23, 24 and 25 are submerged in a fluid 26 of low conductivity, so that they are under the surface of the liquid in any position near level, and consequently out of contact with the normal path of travel of the bubble 20. As shown in Fig. 1, I provide a standard Wheatstone bridge circuit, wherein the pair of electrodes 22, 23 and the pair of electrodes 24, 25 constitute the variable arms of the bridge, and balanced resistances 28 constitute the fixed arm of the bridge. A source 29 of direct current and a galvanometer 30 are connected into the circuit in the conventional manner. The resistance across either pair of electrodes or contacts depends on the depth of the adjacent fluid, which in turn is affected by movement of the bubble 20. For example, in Fig. 1, wherein the bubble 20 lies to the left of the normal or median position, the effective current path between the left-hand electrodes 22 and 23 is less than that between the right-hand electrodes 24 and 25. The unbalance is indicated by the galvanometer 30, the deflection of which therefore indicates the direction and approximate amount of displacement of the bubble from the median or "true-level" position. When the bubble 20 returns to the latter position, the galvanometer 30 gives a null reading.

Fig. 2 shows a simple photoelectric arrangement utilizing the transparent level vial 21 and the bubble 20 of the ordinary bubble level, which are illuminated by means of an electric lamp 31 and a condensing lens 32. Some of the light from the lamp passes upward through the vial and the slit 33 of a plate 34 placed above the vial. The beam of light thus passing through the plate falls upon a photo cell 35, thus causing current to flow in a microammeter 36. The apparatus is so constructed, in the specific instance illustrated, that the beam of light referred to traverses the vial 21 at such a point that the center of the beam coincides with the normal path of travel of one extremity of the meniscus forming the bubble 20.

The amount of light reaching the photo cell depends on the position of the bubble as shown in Fig. 3. That figure is a plan view showing the plate 34 and a portion of the level vial 21. Due to the refraction effect of the fluid within the vial 21, that portion of the vial which lies beyond the end of the bubble 20 exhibits a bright zone 37 bounded by the broken line 37A. The zone externally bounded by the meniscus forming the bubble 20 is less bright, and a narrow dark crescent-shaped zone 38 appears at the extremity of the bubble 20. As shown in Fig. 3, the slit 33 in the plate 34 is made in the approximate size of the dark crescent-shaped zone 38. A maximum variation in the intensity of the light reaching the cell is thereby obtained, as the end of the bubble 20 passes beneath the slit 33. The diagram of Fig. 4 illustrates a typical variation in the response of the indicator 36, as the end of the bubble 20 passes from a point lying on one side of the light beam to a point on the other side. The slit can be so adjusted longitudinally that level occurs at some desirable point on the curve, such as at 39, where the rate of change is most rapid and sensitivity greatest.

Fig. 5 shows another photoelectric system, and is a sectional view through the level vial 21. The level vial is carefully polished inside and outside, so that it acts as a cylindrical lens. The focal length of this lens will be shorter when the portion of the vial traversed by the light beam is completely filled with liquid than when that portion of the vial is occupied by the bubble 20. Light from lamp 31 is concentrated on the vial by condenser lens 32 and is converged by the lens effect of the vial. When that portion of the vial traversed by the beam of light is full of fluid, the beam of light converges at a slit 33A in a plate 34A and passes through as indicated in Fig. 5. When the bubble is present, the beam of light converges less, and only a portion of the total light passes through the slit 33A, as also shown in Fig. 5. The light thus passing through the slit 33A is directed by a lens 37 so as to strike the photo cell 35, which, as in the previous instance described, is connected to a microammeter 36.

The variation in light intensity will be more readily understood from consideration of Fig. 6. In this figure, the dotted lines indicate the light striking the lower side of the plate 34A. Above the bubble the light is spread out over the area 38. Above the filled part of the vial it is sharply focussed in a narrow area or line 39, of far greater brightness. As the bubble moves along the vial the amount of light passing through the slit 33A will therefore vary.

Typical fluctuations of the photo-cell current in this system are shown in Fig. 7. The depressions in the curve shown in Fig. 4 are practically eliminated and the amount of light reaching the photo cell is therefore increased.

The devices shown in Figs. 2 and 3 can be applied at one end or at both ends of an elongated level vial, but since the bubble usually contracts with rising temperature, it is frequently desirable to apply them to both ends of such a vial unless the level is maintained at constant temperature.

The device shown in Fig. 1 is adapted to furnish indications of bubble movement at each end of the level vial, and the indicating means associated therewith is so constituted as to provide a null reading when the level vial is in a level or true horizontal position. This is frequently desirable. In much the same manner, the photoelectric device of Fig. 5 may be adapted to give a similar null reading, as shown in Fig. 8. In this instance, the level vial 21 and bubble 20 are illuminated at both ends by means of electric lamps 31 and condensing lens 32, opposite which are located plates 34A, respectively. The light beams after passing through the slits 33A of the plates 34A form parallel beams at corresponding lenses 37 and then converge and pass into the two photo cells 35. The photo cells 35 are connected in series with a microammeter 36, in such position that the outputs of the two cells 35 are opposed to each other. The two photo cells being connected in series with their outputs opposed, zero output indicates level position.

The electrical characteristics of this system are graphically illustrated in Fig. 9. As shown therein, the outputs of the two opposed photo cells 35 are represented by the broken-line curves 40 and 41, respectively, while the full-line curve 42 shows the actual resultant indication of the microammeter 36; it is the effective sum of the curves 40 and 41. No current flows at the level position indicated at 43. The sensitivity of this system is about twice that of the system shown in Fig. 5.

In Fig. 10 there is shown a simple arrangement in which a level bubble is made to affect an electrical circuit directly by using changes of capacitance caused by motion of the bubble. In this instance, the liquid within the level vial is an electrolyte, and movement of the bubble within the vial affects the capacitance of a condenser formed by plates 44 and 45. Or in other words, the electrolyte within the vial 21 serves as the movable plate of the condenser, the externally located plate 44 being the other, fixed plate. The capacitance of the condenser so constituted, which is thus an indication of the position of the bubble 20, may be measured in various ways, but I have shown in Fig. 10 one simple form of electrical circuit for this purpose, comprising a capacity bridge arrangement having a source 46 of audible high frequency current, a resistor 47, a sliding contact 48, a receiver 49 and a fixed condenser 50. In using this device, the sliding contact 48 is moved until the two arms of the bridge circuit, containing the variable level-vial condenser and the fixed condenser 50, respectively, are in balance, as indicated by absence of sound in the receiver 49. The position of the sliding contact 48 along the resistor 47 will thus indicate the position of the bubble 20.

An arrangement is shown in Fig. 11 in which capacitances 51 and 52, positioned adjacent opposite levels of the bubble 20 (when the latter is in the normal or true-level position), are balanced against resistors 47 and 53 respectively, by means of a sliding contact 48. A source 46 of audible high frequency current and a receiver 49 complete the arrangement. The sliding contact 48 can be adjusted to determine the direction of inclination. Level is indicated when the null occurs when the sliding contact 48 is centered.

Fig. 12 shows a self-leveling device in which the bubble level is arranged, through relays, to automatically correct the position of the apparatus with which it is associated. As shown, the vial 21 is mounted in fixed relation with respect to an angularly adjustable support 54 pivoted at 55 to some fixed base (not shown). The support 54 is also adapted to carry a gravimeter or other apparatus, not shown, which it is desired to keep level. The support is movable by means of a motor 56, through a gear segment 57 and worm 58 as shown. The motor, as indicated conventionally in the figure, is of the D. C. shunt type, which can be reversed by changing the armature polarity, and has a field terminal 59, an armature terminal 60 and a common terminal 61. Two batteries are provided at 62 and 63, as shown, the terminal of each battery being connected to the common terminal 61 through a switch 64 and a lead 65, and the opposite terminals of the batteries being connected to the armature terminal 60 through leads 66 and 67 as shown. Lead 66 is controlled by a normally open solenoid switch 68 and lead 67 by a similar switch 69. Thus, assuming switch 64 to be closed, upon closure of switch 68 the motor will rotate in one direction and on closure of switch 69 (and opening of switch 68) the motor will rotate in the opposite direction.

The relay circuit shown includes two identical oscillatory vacuum-tube circuits, adapted to respond to the small circuit fluctuations produced by variations in capacitances 70 and 71 in accordance with movement of the bubble 20 within the vial 21. Referring to the right-hand circuit, this comprises a triode vacuum tube 72 with hot cathode 74, grid 76 and plate 78. The grid circuit includes a capacitance 80 and inductance 82 in parallel, connected to the cathode by a lead 84 and to the grid through a condenser 86, with a resistance 88 shunted across it, and a lead 90. The plate circuit includes a lead 92, a lead 94, an inductance 96 and capacitance 98 in parallel, a B-battery 100, the solenoid of switch 68, and lead 84 to the cathode. The grid circuit is tuned by the inductance-capacitance filter 82, 80, and the plate circuit is tuned by the filter 96, 98. A neutralizing circuit is provided, across grid and plate, including a flexible lead 102 connected to grid lead 90 and to the level-capacitance 70, and a flexible lead 104, as shown.

Inductance coils 80 and 96 are in inductive relation to each other, and coils 81 and 97 are in inductive relation to each other.

The left-hand relay circuit is a duplicate of the right-hand circuit described, and bears the same reference numerals each increased by 1; thus the vacuum tube 73 corresponds to the vacuum tube 72 of the right-hand circuit.

Both the right-hand and left-hand circuits are initially adjusted to be neutralized in a non-oscillating state just short of oscillation, and remain in this state so long as the level-bubble stays centered. Upon movement of the bubble to the right (corresponding to a leftward tilt of support 54) capacitance 70 changes, unbalancing the right-hand control circuit and causing oscillations. The relatively large plate current developed closes switch 68, and the motor rotates in such direction as to tip the support 54 back to level. At level position the circuit again becomes balanced, and switch 68 opens. As for the left-hand circuit, during the operation described the capacitance 71 also changes, but not in the direction which would unbalance the circuit, so that switch 69 is unaffected. Should the support 54 tilt to the right, the left-hand circuit will bring it back to level in an exactly similar manner.

By suitable adjustment of the various circuit elements, the oscillatory circuit can be made exceedingly sensitive so as to respond to a very small displacement of capacitances 70 and 71. By suitable adjustment of the various circuit components the change from the oscillating state to the non-oscillating state may be made abrupt or sluggish, but the more abrupt the change, the better it is suited to this particular purpose; the system will therefore register with great sensitivity.

The vacuum-tube circuits described each constitute an extremely sensitive form of relay, and make for high sensitivity and precision of operation. Simplified relays can be employed where the requirements are not so exacting.

The system of Fig. 12 is shown arranged to level an apparatus in one plane. Of course, level in two planes can be accomplished by duplication of the system of Fig. 12. The same is true of any of the systems previously shown.

In Fig. 13 there is shown a simple system for electrically indicating the position of a level bubble 20 within a level vial 21. Contacts 22, 23, 24 and 25 project into the level vial and contact a fluid 26. This fluid is conductive and current flowing from batteries 29 will operate corresponding signals or indicating devices, such as lamps 106, unless the circuit is interrupted by the presence of the bubble 20, which is non-conductive. Both lamps will light if the bubble lies between the contacts, thus indicating that the vial is level. If the level is tilted the lamp connected to the high end of the level will be cut off.

While it has been mentioned that a level of this type can be applied to under-water gravimeters, it is to be understood that the various embodiments of the invention can be applied to any apparatus that is placed in an inaccessible position where it is desired to transmit an indication of the equilibrium of the apparatus to some remote point.

Moreover, it will be understood that, while I have illustrated various specific illustrative forms and details, my invention in its broader aspects is not limited to such specific forms or details, but may variously be used and embodied, within the scope of the claims hereinafter made.

What I claim is:

1. In combination, a level vial containing an electrically conducting liquid and a non-conducting bubble, a pair of electrical terminals located out of the normal path of travel of said bubble but in such position that the characteristics of field between said terminals are varied by changes in position of said bubble, and an indicating device so connected with said terminals as to exhibit changes in said field caused by such changes in position of said bubble.

2. In combination, an elongated bubble level, separate means adjacent both ends of the bubble within the level and adapted to vary corresponding electrical circuits in accordance with changes in position of said bubble, and indicating means located in said circuits for response to variations so induced; said indicating means being so disposed with respect to said circuits as to provide a null reading when the bubble lies in a predetermined position corresponding to a "true-level" position of the level.

3. A level comprising a vial, a fluid within said vial, a bubble within said fluid, electrodes within said vial adjacent to the path of but not touching said bubble in the sensitive part of its range, and means for indicating the electrical impedance between said electrodes.

4. A telemetric level comprising a vial, a fluid within said vial, a bubble within said fluid, means adjacent the ends of said vial electrically responsive to the position of said bubble and symmetrical with respect to the long axis of the vial whereby error due to tilting of the vial about its long axis is minimized, and means for balancing the response of said last-mentioned means to obtain a null indication corresponding to a definite position of said bubble.

5. In combination, a bubble level, electrical condenser plates adjacent to the path of the bubble in said level but not touching said bubble in the sensitive part of its range, and indicating means responsive to the electrical capacitance between said electrical condenser plates.

6. A self-leveling device comprising, in combination, a bubble level, tilting means therefor, means adjacent the ends of the bubble in said level responsive to deviations of the bubble therein from a central position, said last-mentioned means being adapted to move said tilting means toward a position of mid level wherein the bubble occupies said central position whenever said bubble is temporarily displaced to an off-center position.

7. In combination, a bubble level, electrical means adjacent opposite sides of the bubble within said level, each being responsive to movement of the bubble in its direction, driving means connected to said level, and controlling means adapted to cause said driving means to return said level to a horizontal position whenever either of said electrical means indicates a temporary deviation of the level therefrom.

8. In combination, a bubble level, electrical means adjacent opposite sides of the bubble within said level, each being responsive to movement of the bubble in its direction, means for biasing said level toward a horizontal position in accordance with a response from either of said electrical means, and means for stopping said biasing means when the responses from said electrical means are identical.

9. In a telemetric leveling apparatus, in combination an elongated substantially cylindrical level vial partly filled with liquid so as to define a bubble, an electrical bubble position responsive means located adjacent an end of the bubble in its level position and symmetrically disposed with respect to the vertical plane passing through the long axis of the vial whereby the disturbing effect of tipping of the vial about said axis is minimized, and electrical indicating means connected to said bubble position responsive means.

10. A telemetric leveling apparatus comprising in combination a level vial partly filled with liquid to define a bubble, electric bubble position responsive means disposed adjacent each end of the bubble in its normal position and of such character as to permit unrestricted movement of the bubble in the vial, whereby upon movement of the bubble away from level position the position-responsive means produce electrical signals of opposite sense, and electrical indicating means connected to said position-responsive means.

11. A telemetric leveling apparatus comprising in combination a level vial partly filled with liquid so as to define a bubble, at least a pair of electrode means spaced from each other located close to the bubble but out of the path of travel of the bubble in the sensitive part of its range so that movement of the bubble changes the characteristics of the electrical field between the electrode means without coming into actual contact therewith, and electrical indicating means connected to said electrode means.

12. A telemetric leveling apparatus comprising in combination an elongated level vial partly filled with liquid so as to define a bubble adapted to bend light impinging thereon, light source means arranged to send light, in the vertical plane which passes through the vial axis, to the portion of the vial adjacent the end of the bubble in its level position, and a photoelectric cell arranged to receive light rays from said portion of the vial in said vertical plane, so that movement of the bubble in one direction bends light rays away from the cell and movement in the other direction bends light rays to the cell, thereby causing a variation in cell current.

13. A telemetric leveling apparatus comprising in combination a level vial containing a bubble, light source means arranged to direct light through the vial substantially in a vertical direction, and photoelectric cell means arranged to receive light after passage through the vial, so that when the bubble is in the path of said light the vial acts as a lens of different power from that when the bubble is out of said path, and thereby changes the amount of light reaching the photoelectric cell means.

14. In a telemetric leveling apparatus, in combination an elongated level vial partly filled with liquid to define a bubble, light source means arranged to direct light to the portions of the vial adjacent each end of the bubble in its level position, and a pair of photoelectric cells arranged to receive light from said portions of the vial, so that movement of the bubble away from its normal position causes a change, in opposite senses, in the amount of light reaching the two cells.

15. A telemetric apparatus comprising in combination a level vial containing a bubble, light source means arranged to direct light through the vial substantially in a vertical direction, photoelectric cell means arranged to receive light after passage through the vial, so that when the bubble is in the path of said light the vial acts as a lens of power different from that when the bubble is out of said path, and thus changes the amount of light reaching the cell means, and a diaphragm with a restricted aperture in the path of said light and located adjacent an end of the bubble in its level position.

THEODORE B. PEPPER.